United States Patent
Luo et al.

(10) Patent No.: US 12,231,002 B2
(45) Date of Patent: Feb. 18, 2025

(54) MOTOR COOLING STRUCTURE, DRIVE ASSEMBLY AND VEHICLE

(71) Applicant: GREAT WALL MOTOR COMPANY LIMITED, Hebei (CN)

(72) Inventors: Pingyuan Luo, Baoding (CN); Liang Xiong, Baoding (CN); Yadong Wang, Baoding (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 308 days.

(21) Appl. No.: 17/765,584

(22) PCT Filed: Dec. 22, 2020

(86) PCT No.: PCT/CN2020/138252
§ 371 (c)(1),
(2) Date: Jul. 20, 2022

(87) PCT Pub. No.: WO2021/129599
PCT Pub. Date: Jul. 1, 2021

(65) Prior Publication Data
US 2023/0006486 A1 Jan. 5, 2023

(30) Foreign Application Priority Data
Dec. 24, 2019 (CN) .......................... 201911351106.5

(51) Int. Cl.
*H02K 1/20* (2006.01)
*H02K 5/20* (2006.01)

(52) U.S. Cl.
CPC ............... *H02K 1/20* (2013.01); *H02K 5/203* (2021.01)

(58) Field of Classification Search
CPC ............ H02K 1/20; H02K 5/203; H02K 5/20; H02K 7/116
(Continued)

(56) References Cited

U.S. PATENT DOCUMENTS

| 9,692,277 B2 | 6/2017 | Pearce, Jr. et al. | |
|---|---|---|---|
| 2010/0007227 A1* | 1/2010 | Smith | H02K 5/203 310/64 |

(Continued)

FOREIGN PATENT DOCUMENTS

| CN | 102005833 A | 4/2011 |
|---|---|---|
| CN | 203674894 U | 6/2014 |

(Continued)

OTHER PUBLICATIONS

International Application No. PCT/CN2020/138252 International Search Report and Written Opinion with partial English Machine Translation mailed Mar. 8, 2021, 10 pgs.

*Primary Examiner* — Terrance L Kenerly
*Assistant Examiner* — Theodore L Perkins
(74) *Attorney, Agent, or Firm* — Fredrikson & Byron, P.A.

(57) ABSTRACT

A motor cooling structure, including: branch flow-channels, shell flow-channels, end cover flow-channels, a liquid inlet and a liquid outlet. A plurality of the branch flow-channels are circumferentially arranged on a stator of a motor around an axis of the motor. The shell flow-channels includes a liquid inlet flow-channel, a plurality of shell long flow-channels and a liquid outlet flow-channel, which are circumferentially arranged on a reducer shell around the axis of the motor. The end cover flow-channels includes a plurality of the end-cover long flow-channels are circumferentially arranged on a motor end cover around the axis of the motor. The shell flow-channels, the plurality of branch flow-channels and the end cover flow-channels form a continuous total flow-channel. The liquid inlet and liquid outlet both disposed on the reducer shell are in communication with the liquid inlet flow-channel and liquid outlet flow-channel, respectively.

17 Claims, 6 Drawing Sheets

(58) Field of Classification Search
USPC .......................................... 310/54, 58, 59, 52
See application file for complete search history.

(56) References Cited

U.S. PATENT DOCUMENTS

| | | | | |
|---|---|---|---|---|
| 2012/0181848 | A1* | 7/2012 | Makino | H02K 7/14 |
| | | | | 301/6.5 |
| 2017/0063191 | A1* | 3/2017 | Kirkley, Jr. | F16C 35/045 |
| 2017/0244305 | A1* | 8/2017 | Ploeger | H02K 5/06 |
| 2018/0170169 | A1* | 6/2018 | Lee | B60K 1/00 |
| 2018/0331594 | A1* | 11/2018 | Yagyu | F28F 1/16 |

FOREIGN PATENT DOCUMENTS

| | | | |
|---|---|---|---|
| CN | 105264752 | A | 1/2016 |
| CN | 106026530 | A | 10/2016 |
| CN | 206237254 | U | 6/2017 |
| CN | 108206610 | A | 6/2018 |
| CN | 207705998 | U | 8/2018 |
| CN | 207790311 | U | 8/2018 |
| CN | 109450171 | A | 3/2019 |
| CN | 208738934 | U | 4/2019 |
| CN | 208849563 | U | 5/2019 |
| CN | 208955806 | U | 6/2019 |
| CN | 209119985 | U | 7/2019 |
| CN | 110266127 | A | 9/2019 |
| CN | 110277842 | A | 9/2019 |
| DE | 102017210778 | A1 | 12/2018 |
| JP | 2006026774 | A | 2/2006 |
| JP | 2016525333 | A | 8/2016 |
| JP | 2019213258 | A | 12/2019 |

* cited by examiner

MOTOR COOLING STRUCTURE, DRIVE ASSEMBLY AND VEHICLE

CROSS-REFERENCE TO RELATED APPLICATIONS

This application is a 35 U.S.C. § 371 national stage application of PCT Application Ser. No. PCT/CN2020/138252 filed on Dec. 22, 2020, which claims the benefit of Chinese Patent Application No. 201911351106.5 filed on Dec. 24, 2019, the contents of which are incorporated herein by reference.

TECHNICAL FIELD

The present disclosure generally relates to the field of automobile technologies, and in particular, to a motor cooling structure, a drive assembly, and a vehicle.

BACKGROUND

During the operation of the motor, the stator, coils and rotor of the motor will generate a lot of heat, and the power margin of the motor is often limited by the temperature rise limit of the motor. Therefore, improving the cooling and heat dissipation capacity of the motor can significantly improve the power density of the motor.

At present, the cooling methods of on-board motors mainly include water cooling and oil cooling. The water-cooling method is to design a water channel on the motor shell, and the heat inside the motor is transferred to the water channel through layers of media, and then the heat is taken away by the cooling liquid. The advantage of the water-cooling method is that the cost is low, and it can basically meet the heat dissipation requirements of the motor. The disadvantage is that the indirect cooling method has poor heat dissipation efficiency. The oil cooling method, due to the non-conductive and non-magnetic properties of the oil, can directly cool the stator and winding of the motor, which can meet the cooling requirements of high-performance motors. However, the oil cooling method currently used is spray oil cooling, which increases the cost of the motor.

SUMMARY

The present disclosure aims to provide a motor cooling structure, a drive assembly and a vehicle, the motor cooling structure realizes immersion cooling and has a good cooling effect.

In accordance with an embodiment of the present disclosure, a motor cooling structure is provided. The motor cooling structure includes: branch flow-channels, shell flow-channels, end cover flow-channels, a liquid inlet and a liquid outlet. A plurality of the branch flow-channels are circumferentially arranged on a stator of a motor around an axis of the motor. The shell flow-channel includes a liquid inlet flow-channel, shell long flow-channels and a liquid outlet flow-channel. The liquid inlet flow-channel, a plurality of the shell long flow-channels and the liquid outlet flow-channel are circumferentially arranged on a reducer shell around the axis of the motor. The end cover flow-channel includes end-cover long flow-channels, and a plurality of the end-cover long flow-channels are circumferentially arranged on a motor end cover around the axis of the motor. The shell flow-channels, the plurality of branch flow-channels and the end cover flow-channels are formed a continuous total flow-channel. The liquid inlet is disposed on the reducer shell and is in communication with the liquid-inlet flow-channel. The liquid outlet is disposed on the reducer shell and is in communication with the liquid outlet flow-channel.

In accordance with some embodiments of the present disclosure, the branch flow-channels extend along the axis of the motor.

In accordance with some embodiments of the present disclosure, a first resin glue is disposed outside one end of coils of the motor close to the reducer shell, the first resin glue is located inside a circumference formed by the shell flow-channels, and an inner wall of liquid outlet the flow-channel is defined with an opening, and the opening of the liquid outlet flow-channel and the liquid outlet are respectively arranged on both sides of the first resin glue.

In accordance with some embodiments of the present disclosure, a second resin glue is disposed outside one end of the coils of the motor close to the motor end cover, and the second resin glue is located inside a circumference formed by the end cover flow-channels; the end cover flow-channels also includes end-cover short flow-channels, two end-cover short flow-channels and a plurality of the end-cover long flow-channels are circumferentially arranged on the motor end cover around the axis of the motor, and inner walls of the two the end-cover short flow-channels are respectively defined with an opening.

In accordance with some embodiments of the present disclosure, the two end-cover short flow-channels are respectively arranged on both sides of the second resin glue.

In accordance with some embodiments of the present disclosure, one branch flow-channel and an adjacent branch flow-channel on one side are in communication with each other through the shell long flow-channel.

In accordance with some embodiments of the present disclosure, the one branch flow-channel and another adjacent branch flow-channel on another side are in communication with each other the end-cover long flow-channel.

In accordance with some embodiments of the present disclosure, the liquid outlet is connected to an oil inlet of a reducer.

In accordance with an embodiment of the present disclosure, a drive assembly is provided, which includes a motor, a reducer, and the motor cooling structure as above-described.

In accordance with an embodiment of the present disclosure, a vehicle is provided, which includes the drive assembly as described above.

In the motor cooling structure of the present disclosure, the branch flow-channels run through the stator of the motor, the shell flow-channels, the plurality of branch flow-channels and the end cover flow-channels form a continuous total flow-channel, which realizes immersion cooling of the motor and has a good cooling effect. The flow directions of the cooling oil in two adjacent branch flow-channels are opposite to each other, and the cooling oil can circulate axially in the plurality of branch flow-channels to improve the cooling effect. The motor cooling structure can also cool the resin glue at both ends of the coils to realize the cooling for the ends of the coils.

BRIEF DESCRIPTION OF THE DRAWINGS

The drawings constituting a part of the present disclosure are used to provide further understanding of the present disclosure, and the exemplary embodiments of the present disclosure and the descriptions thereof are used to explain the present disclosure without constituting any improper limitations to the present disclosure. In the drawings.

Figure 1:
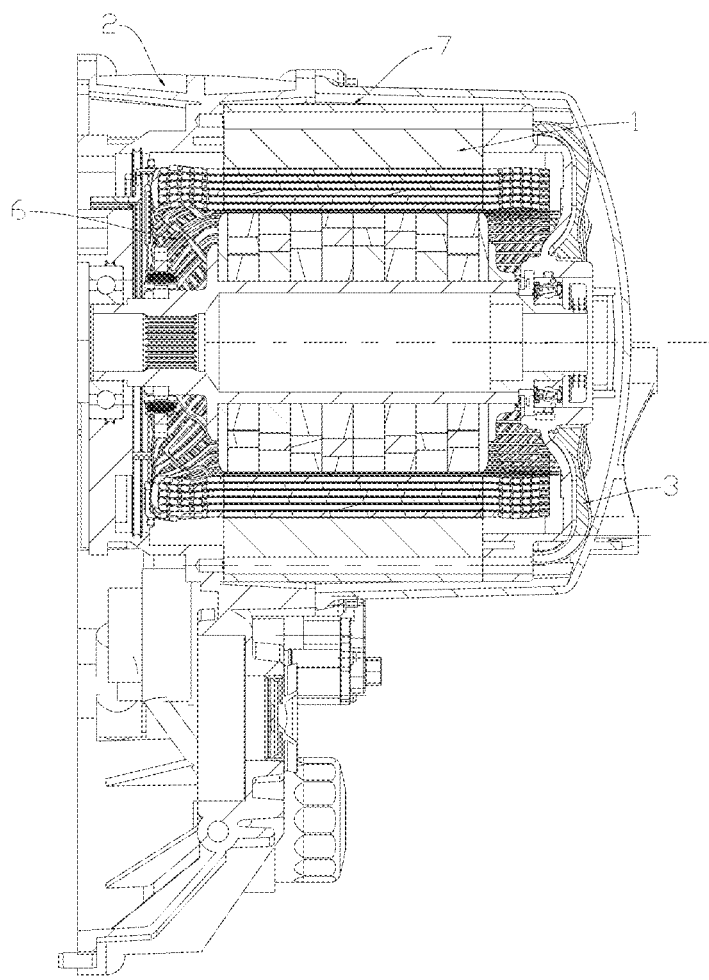
FIG. 1 is a schematic diagram of a motor connected with a reducer according to an embodiment of the present application.

LIST OF REFERENCE NUMBERS 1 stator;
100 branch flow-channels; 101 first branch flow-channel; 102 second branch flow-channel; 103 third branch flow-channel; 104 fourth branch flow-channel; 105 fifth branch flow-channel; 106 sixth branch flow-channel; 107 seventh branch flow-channel; 108 eighth branch flow-channel; 109 ninth branch flow-channel; 110 tenth branch flow-channel; 111 eleventh branch flow-channel; 112 twelfth branch flow-channel;
2 reducer shell; 201 liquid inlet; 202 liquid outlet;
200 shell flow-channels; 211 liquid inlet flow-channel; 212 liquid outlet flow-channel; 221 first shell long flow-channel; 222 second shell long flow-channel; 223 third shell long flow-channel; 224 fourth shell long flow-channel; 225 fifth shell long flow-channel; 200a opening;
3 motor end cover;
300 end cover flow-channels; 311 first end-cover long flow-channel; 32 second end-cover long flow-channel; 313 third end-cover long flow-channel; 314 fourth end-cover long flow-channel; 315 fifth end-cover long flow-channel; 321 first end-cover short flow-channel; 322 second end-cover short flow-channel; 300a opening; 300b opening;
4 first resin glue;
5 second resin glue;
6 coils; and
7 motor shell.

DETAILED DESCRIPTION OF THE EMBODIMENTS

In the following, only certain exemplary embodiments are briefly described. As those skilled in the art would realize, the described embodiments may be modified in various different ways without departing from the spirit or scope of the present disclosure. Accordingly, the drawings and description are considered as illustrative in nature rather than restrictive.

In the description of the present disclosure, it should be understood that the terms indicating orientation or positional relationship, such as "center", "longitudinal", "lateral", "length", "width", "thickness", "top", "bottom", "front", "rear", "left", "right", "straight", "horizontal", "top", "bottom", "inner", "outer", "clockwise", "counterclockwise" etc., are based on the orientation or positional relationship shown in the drawings, and are used only for the convenience of describing the present disclosure and simplifying the description, rather than indicating or implying that the device or element referred to must have a specific orientation, or be constructed and operated in a specific orientation, and thus, those terms should not be construed as limitations to the present disclosure. In addition, the terms "first" and "second" are used only for the purpose of description, and should not be understood as indicating or implying relative importance or implicitly indicating the number of the indicated technical features. Thus, features defined as "first", "second" may expressly or implicitly include one or more of said features. In the description of the present disclosure, the phase "a/the plurality of" means two or more, unless expressly and specifically defined otherwise.

In the description of the present disclosure, it should be noted that the terms "installed/mounted", "connected with" and "connected/coupled to" should be understood in a broad sense, unless expressly specified or defined otherwise, for example, it may be a fixed connection or a detachable connection, or an all-in-one connection; it may be a mechanical connection, an electrical connection or may be in communication with each other; it may be directly connected or may be indirectly connected through an intermediate medium, it may be an internal communication of two elements or an interactive relationship of two elements. For those of ordinary skill in the art, the specific meanings of the above terms in the present disclosure can be understood according to specific situations.

In the present disclosure, unless otherwise expressly specified and defined, a first feature "on/above" or "under/below" a second feature may include that the first and second features are in a direct contact, or the first and second features are in an indirect contact through additional features between them. Also, the first feature being "on", "over" or "above" the second feature may include that the first feature is directly above or obliquely above the second feature, or simply means that the first feature has a higher level than the second feature. The first feature "under", "below" or "beneath" the second feature may include that the first feature is directly below and obliquely below the second feature, or simply means that the first feature has a lower level than the second feature.

The following disclosure provides many different embodiments or examples for implementing different structures of the present disclosure. In order to simplify the disclosure of the present disclosure, the components and arrangements of specific examples are described below. It can be understood that the description here are merely some exemplary embodiments and are not intended to limit the present disclosure. Furthermore, reference numerals and/or reference letters may be repeated in different instances of the present disclosure for the purpose of simplicity and clarity, but not in itself indicative of a relationship between the various implementations and/or arrangements discussed. In addition, the present disclosure provides examples of various specific processes and materials, but one of ordinary skill in the art would recognize the application of other processes and/or the use of other materials.

The preferred embodiments of the present disclosure will be described below with reference to the drawings. It should be understood that the preferred embodiments described herein are only used to illustrate and explain the present disclosure, but not to limit the present disclosure.

As shown in FIG. 1, a stator 1 of a motor is located in a motor shell 7, and coils 6 are wound on the stator 1. Both ends of the coils 6 extend out from the ends of the stator 1, respectively. A reducer shell 2 is arranged at one side of the stator 1 and is connected to the motor shell 7. A motor end cover 3 is arranged at the other side of the stator 1.

Figure 2:
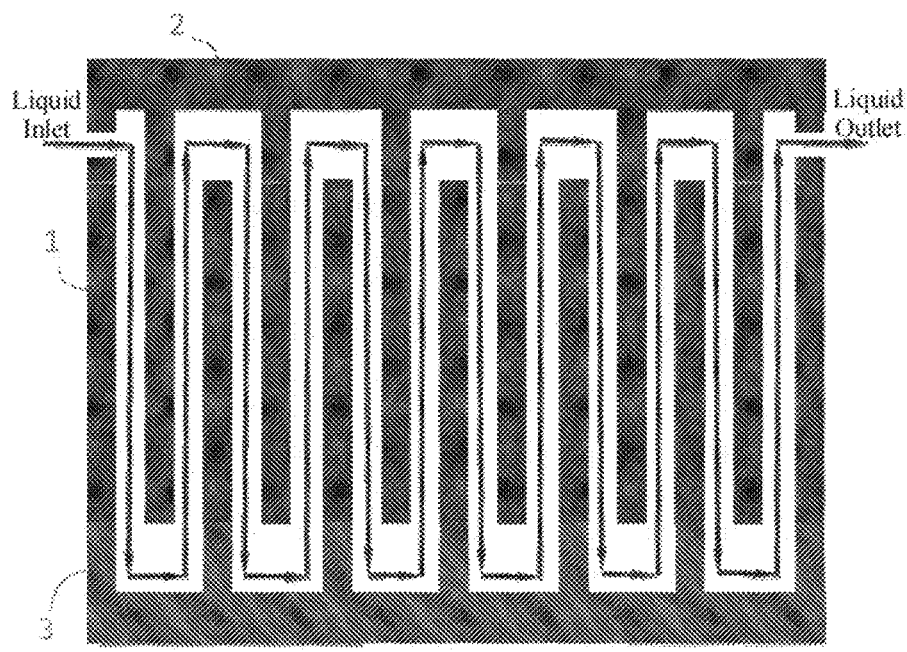
FIG. 2 is a schematic diagram showing a flow direction of cooling oil according to an embodiment of the present application.

As shown in FIG. 2, in an exemplary embodiment, continuous flow-channels are provided on the stator 1, the reducer shell 2 and the motor end cover 3. The cooling oil can perform immersion cooling on the stator 1 through the flow-channels, and can also cool the coils 6, and the cooling effect is good. The motor cooling structure includes branch flow-channels 100, shell flow-channels 200, end cover flow-channels 300, a liquid inlet 201 and a liquid outlet 202.

Figure 3:
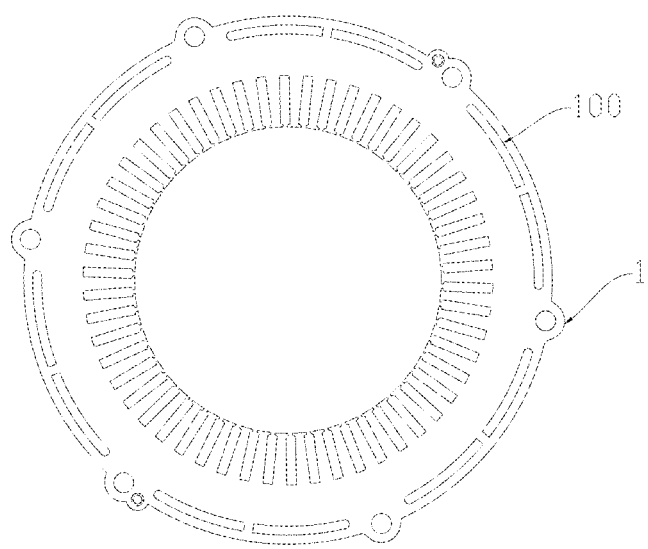
FIG. 3 is a schematic diagram of a stator according to an embodiment of the present application.
Figure 4:
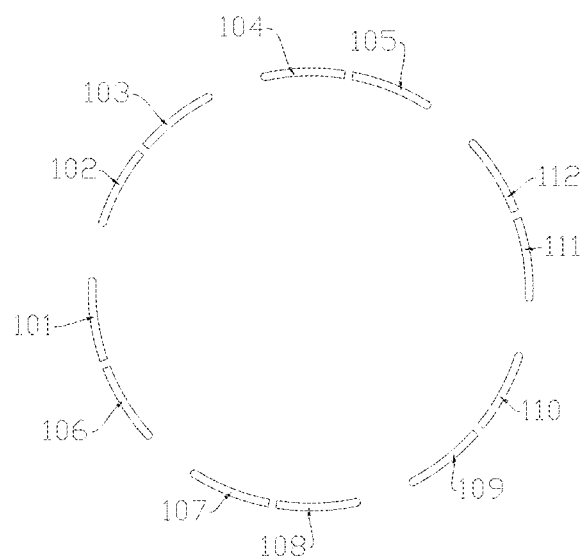
FIG. 4 is a schematic diagram showing branch flow-channels according to an embodiment of the present application.

As shown in FIG. 3 and FIG. 4, the stator 1 of the motor is provided with a plurality of branch flow-channels 100. The branch flow-channels 100 are not communicated with each other. A plurality of branch flow-channels 100 are circumferentially arranged around an axis of the motor. In an exemplary embodiment, the number of branch flow-channels 100 is twelve. It is not difficult for those skilled in the art to understand that the number of branch flow-channels 100 can be appropriately increased or decreased according to requirements. Optionally, the branch flow-channels 100 extend along the axis of the motor.

Figure 5:
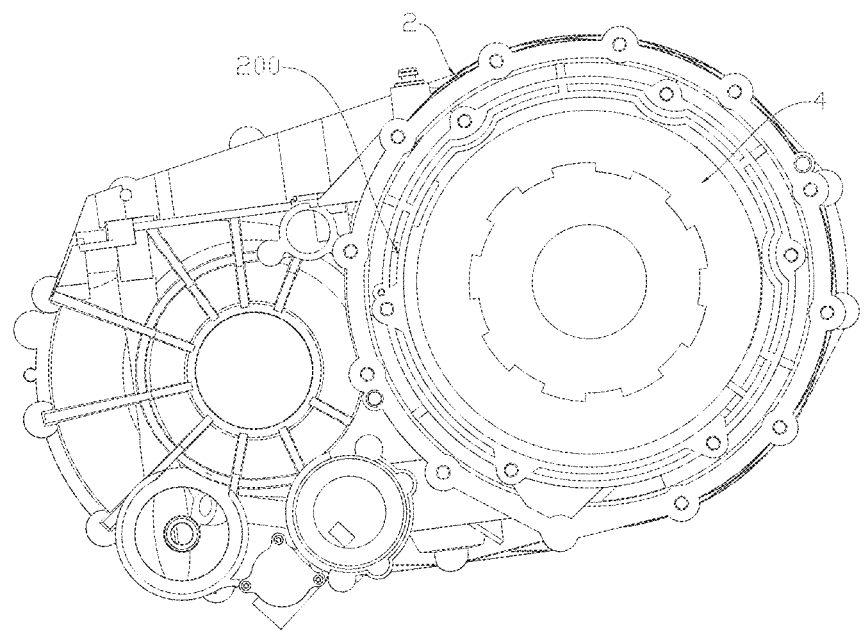
FIG. 5 is a schematic diagram of a reducer shell according to an embodiment of the present application.
Figure 6:
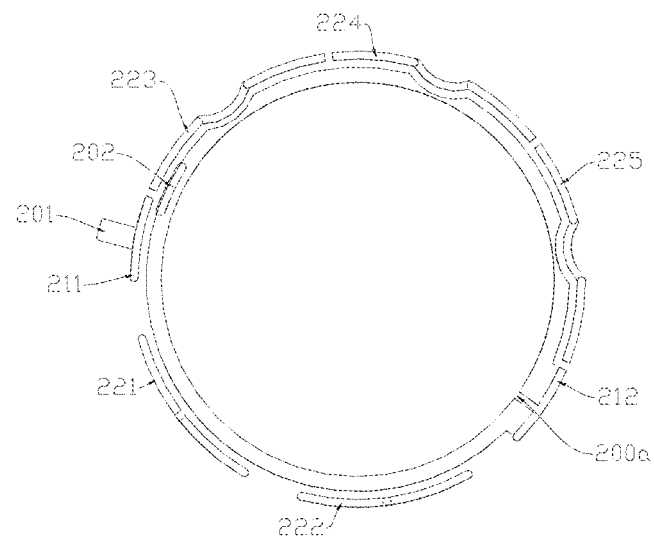
FIG. 6 is a schematic diagram showing shell flow-channels according to an embodiment of the present application.

As shown in FIG. 5 and FIG. 6, a side wall of the reducer shell 2 close to the stator 1 is provided with shell flow-channels 200. The shell flow-channels 200 include a liquid inlet flow-channel 211, a plurality of the shell long flow-channels and a liquid outlet flow-channel 212. In an exemplary embodiment, the number of shell long flow-channels is five. The liquid inlet flow-channel 211, the plurality of shell long flow-channels and the liquid outlet flow-channel 212 are circumferentially arranged on the reducer shell 2 around the axis of the motor. The shell flow-channels 200 are provided corresponding to the branch flow-channels 100.

The liquid inlet flow-channel 211 corresponds to one branch flow-channel, and in an exemplary embodiment, the liquid inlet flow-channel 211 communicates with the first branch flow-channel 101. The liquid outlet flow-channel 212 corresponds to one branch flow-channel, and in an exemplary embodiment, the liquid outlet flow-channel 212 communicates with the twelfth branch flow-channel 112. One shell long flow-channel may correspond to a plurality of branch flow-channels. Optionally, one shell long flow-channel corresponds to two branch flow-channels, so that one branch flow-channel communicates with the end of the adjacent branch flow-channel on one side that is close to the reducer shell 2. For example, the first shell long flow-channel 221 corresponds to the second and third branch flow-channels 102, 103 and in communication with the ends of the second and third branch flow-channels 102, 103 close to the reducer shell 2.

Figure 7:
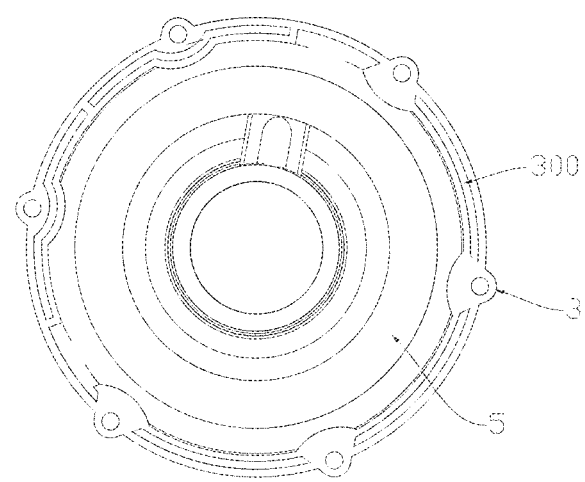
FIG. 7 is a schematic diagram of an end cover of the motor according to an embodiment of the present application.
Figure 8:
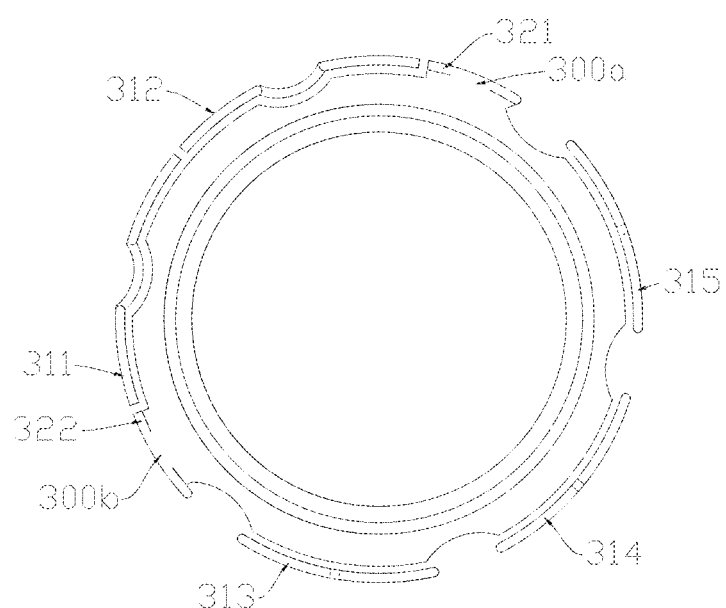
FIG. 8 is a schematic diagram showing flow-channels of the end cover according to an embodiment of the present application.

As shown in FIG. 7 and FIG. 8, a side wall of the motor end cover 3 close to the stator 1 is provided with end cover flow-channels 300. The end cover flow-channels 300 include end-cover long flow-channels. A plurality of the end-cover long flow-channels are circumferentially arranged on the motor end cover 3 around the axis of the motor. The end cover flow-channels 300 are provided corresponding to the branch flow-channels 100.

One end-cover long flow-channel may correspond to a plurality of branch flow-channels. Optionally, one end-cover long flow-channel corresponds to two branch flow-channels, so that the above-mentioned one branch flow-channel communicates with one end of the adjacent branch flow-channel on the other side close to the motor end cover 3. Taking the second branch flow-channel 102 as an example, the ends of the second and third branch flow-channels 102, 103 close to the reducer shell 2 are communicated through the first shell long flow-channel 221. The ends of the second branch flow-channel 102 and the first branch flow-channel 101 close to the motor terminal 3 communicate with each other through the first end-cover long flow-channel 311.

The shell flow-channels 200, the plurality of branch flow-channels 100 and the end cover flow-channels 300 form a continuous total flow-channel. the reducer shell 2 is provided with a liquid inlet 201 and a liquid outlet 202. The liquid inlet 201 communicates with the liquid inlet flow-channel 211. The liquid outlet 202 communicates with the liquid outlet flow-channel 212. The cooling oil enters the total flow-channel through the liquid inlet 201 and is discharged through the liquid outlet 202.

Since the total flow-channel is continuous, after entering the total flow-channel, the colling oil sequentially passes through a plurality of branch flow-channels 100 to perform immersion cooling on the stator 1, and the cooling effect is good. As the flow directions of the cooling oil in the adjacent branch flow-channels 100 are opposite, the stator 1 can be cooled more uniformly.

According to an optional embodiment of the present disclosure, the outer side of one end of the coils 6 of the motor close to the reducer shell 2 is provided with a first resin glue 4. The first resin glue 4 seals the corresponding end of the coils 6. The first resin glue 4 is located inside the circumference formed by the shell flow-channels 200. A closed space is formed between the first resin glue 4 and the reducer shell 2 as a cooling flow-channel for the first resin glue 4. An opening 200a is provided on the inner wall of the liquid outlet flow-channel 212, and the cooling oil enters the cooling flow-channel of the first resin glue 4 through the opening 200a, and then flows out through the liquid outlet 202. In an exemplary embodiment, the opening 200a of the liquid outlet flow-channel and the liquid outlet 202 are respectively disposed on both sides of the first resin glue 4. The cooling oil enters from the opening 200a and flows to the liquid outlet 202 along the cooling flow-channels of the first resin glue 4 on both sides to cool the first resin glue 4. The temperature of the first resin glue 4 is lowered, which can cool the end of the coils 6 close to the reducer shell 2.

According to an optional embodiment of the present disclosure, the outer side of one end of the coils 6 of the motor close to the motor end cover 3 is provided with a second resin glue 5. The second resin glue 5 seals the corresponding end of the coils 6. The second resin glue 5 is located inside the circumference formed by the end cover flow-channels 300. A closed space is formed between the second resin glue 5 and the motor end cover 3 as a cooling flow-channel for the second resin glue 5.

The end cover flow-channels 300 may also include end-cover short flow-channels, the number of the end-cover short flow-channels may be two, i.e., first and second end-cover short flow-channels 321, 322. The first and the second end-cover short flow-channels 321, 322 correspond to one branch flow-channel 100, respectively. The two end-cover short flow-channels and the plurality of end-cover long flow-channels are circumferentially arranged on the motor end cover 3 around the axis of the motor. An opening 300a is formed on an inner wall of the first end-cover short flow-channel 321, and an opening 300b is formed on an inner wall of the second end-cover short flow-channel 322. The cooling oil in the first end-cover short flow-channel 321 enters the cooling flow-channel of the second resin glue 5 through the opening 300a, and then enters the second end-cover short flow-channel 322 through the opening 300b. The cooling oil enters the cooling flow-channel of the second resin glue 5 to cool the second resin glue 5. The temperature of the second resin glue 5 is lowered, which can cool the end of the coils 6 close to the motor end cover 3.

By cooling the first resin glue 4 and the second resin glue 5, the coils 6 are further cooled, and thus the cooling effect of the motor is improved.

Optionally, the two end-cover short flow-channels are respectively disposed on both sides of the second resin glue 5. That is, the opening 300 a and the opening 300 b are disposed on the both sides of the second resin glue 5 respectively, which improves the cooling effect of the second resin glue 5.

Figure 9:
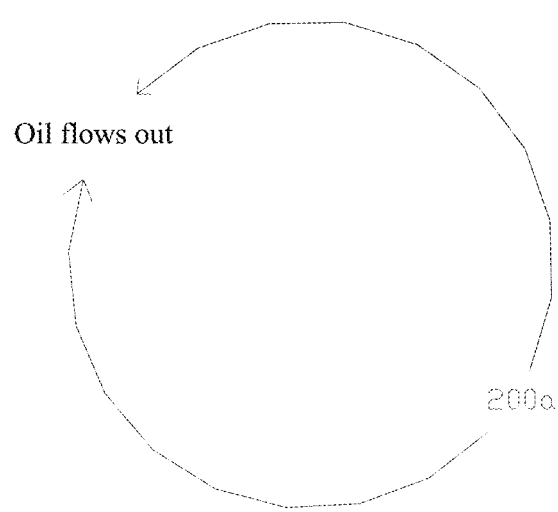
FIG. 9 is a schematic diagram showing a flow direction of cooling oil in a cooling flow-channel of a first resin glue according to an embodiment of the present application.
Figure 10:
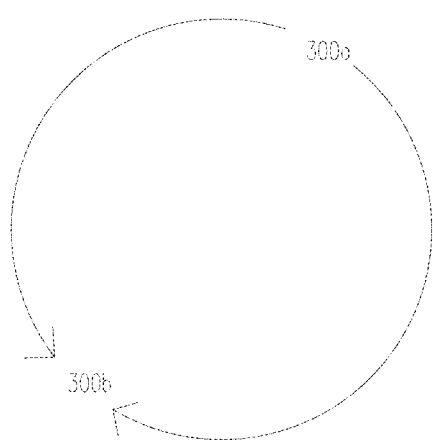
FIG. 10 is a schematic diagram showing a flow direction of cooling oil in a cooling flow-channel of a second resin glue according to an embodiment of the present application.

As shown in FIG. 9 and FIG. 10, the process of cooling the motor by the motor cooling structure in an exemplary embodiment is as follows:
1. The cooling oil enters from the liquid inlet 201 and flows into the liquid inlet flow-channel 211;
2. The cooling oil enters the first branch flow-channel 101 from the liquid inlet flow-channel 211;
3. The cooling oil passes through the first end-cover long flow-channel 311, the second branch flow-channel 102, the first shell long flow-channel 221, the third branch flow-channel 103, the second end-cover long flow-channel 312, the fourth branch flow-channel 104, the second shell long flow-channel 222, the fifth branch flow-channel 105, and the first end-cover short flow-channel 321 in sequence to cool the stator 1;
4. The cooling oil enters the cooling flow-channel of the second resin glue through the opening 300a to cool the second resin glue;
5. The cooling oil enters the second end-cover short flow-channel 322 through the opening 300b, and passes through the sixth branch flow-channel 106, the third shell long flow-channel 223, the seventh branch flow-channel 107, and the third end-cover long flow-channel 313, the eighth branch flow-channel 108, the fourth shell long flow-channel 224, the ninth branch flow-channel 109, the fourth end-cover long flow-channel 314, the tenth branch flow-channel 110, the fifth shell long flow-channel 225, the eleventh branch flow-channels 111, the fifth end-cover long flow-channel 315, the twelfth branch flow-channel 112, and the liquid outlet flow-channel 212 in sequence to cool the stator;
6. The cooling oil enters the cooling flow-channel of the first resin glue through the opening 200a to cool the first resin glue 4; and
7. The cooling oil is discharged through the liquid outlet 202.

According to an optional embodiment of the present disclosure, the liquid outlet 202 is connected to an oil inlet of a reducer. The cooling oil of the motor enters a cavity of the reducer from the oil inlet of the reducer, and acts as lubricating oil to lubricate and cool the gears in the reducer. The lubricated lubricating oil gathers at the bottom of the reducer, and after being filtered by the filter, enters the liquid inlet 201 through the oil pump to cool the motor, so as to realize the circulation of the cooling oil.

An embodiment of the present disclosure provides a drive assembly which includes a motor and a reducer, and also includes the motor cooling structure as described above.

An embodiment of the present disclosure provides a vehicle including the above drive assembly.

In the motor cooling structure of the present disclosure, the branch flow-channels run through the stator of the motor. The shell flow-channels, the plurality of branch flow-channels and the end cover flow-channels form a continuous total flow-channel, which realizes immersion cooling of the motor and has a good cooling effect. The flow directions of the cooling oil in each two adjacent branch flow-channels are opposite to each other, and the cooling oil can circulate axially in the plurality of branch flow-channels to improve the cooling effect. The motor cooling structure can also cool the resin glue at both ends of the coils to realize the cooling for the ends of the coils.

The above descriptions are only preferred embodiments of the present disclosure, and are not intended to limit the present disclosure. Any modifications, equivalent replacements, improvements, etc. made within the spirit and principles of the present disclosure shall be included within the protection scope of the present disclosure.

Finally, it should be noted that the above descriptions are merely preferred embodiments of the present disclosure, and are not intended to limit the present disclosure. Although the present disclosure has been described in detail with reference to the foregoing embodiments, it is still possible for those skilled in the art to make modifications, equivalent replacements, or improvements to the technical solutions described in the foregoing embodiments. Any modification, equivalent replacement, improvement, etc. made within the spirit and principle of the present disclosure shall be included within the protection scope of the present disclosure.

What is claimed is:
1. A motor cooling structure, comprising:
  a plurality of branch flow-channels circumferentially arranged on a stator of a motor around an axis of the motor and running through the stator of the motor;
  a plurality of shell flow-channels arranged on a side wall of a reducer shell and comprising: a liquid inlet flow-channel, shell long flow-channels, and a liquid outlet flow-channel, wherein the liquid inlet flow-channel, the shell long flow-channels, and the liquid outlet flow-channel are circumferentially arranged on the reducer shell around the axis of the motor;
  end cover flow-channels, comprising a plurality of end-cover long flow-channels, and the plurality of end-cover long flow-channels being circumferentially arranged on a motor end cover around the axis of the motor;
  wherein the plurality of shell flow-channels, the plurality of branch flow-channels and the end cover flow-channels form a continuous total flow-channel;
  a liquid inlet disposed on the reducer shell and in communication with the liquid inlet flow-channel; and
  a liquid outlet disposed on the reducer shell and in communication with the liquid outlet flow-channel,
  wherein a first resin glue is disposed outside one end of coils of the motor close to the reducer shell, and wherein the first resin glue is located inside a circumference formed by the plurality of shell flow-channels and configured to form a closed space with the reducer shell as a cooling flow-channel for the first resin glue, wherein an inner wall of the liquid outlet flow-channel is defined with an opening, and the opening of the liquid outlet flow-channel and the liquid outlet are respectively arranged on both sides of the first resin glue.

2. The motor cooling structure according to claim 1, wherein the plurality of branch flow-channels extend along the axis of the motor.

3. The motor cooling structure according to claim 1, wherein a second resin glue is provided outside one end of the coils of the motor close to the motor end cover, and the second resin glue is located inside a circumference formed by the end cover flow-channels.

4. The motor cooling structure according to claim 3, wherein the end cover flow-channels further comprises end-cover short flow-channels, wherein two end-cover short flow-channels and the plurality of end-cover long flow-channels are circumferentially arranged on the motor end cover around the axis of the motor, and inner walls of the two end-cover short flow-channels are respectively defined with an opening.

5. The motor cooling structure according to claim 4, wherein the two end-cover short flow-channels are respectively arranged on both sides of the second resin glue.

6. The motor cooling structure according to claim 1, wherein one branch flow-channel and an adjacent branch flow-channel on one side are in communication with each other through a shell long flow-channel.

7. The motor cooling structure according to claim 6, wherein the one branch flow-channel and another adjacent branch flow-channel on another side are in communication with each other through an end-cover long flow-channel.

8. The motor cooling structure according to claim 1, wherein the liquid outlet is connected to an oil inlet of a reducer.

9. A drive assembly, comprising:
a motor;
a reducer; and
a motor cooling structure, comprising:
  a plurality of branch flow-channels circumferentially arranged on a stator of a motor around an axis of the motor and running through the stator of the motor;
  a plurality of shell flow-channels arranged on a side wall of a reducer shell and comprising a liquid inlet flow-channel, shell long flow-channels and a liquid outlet flow-channel, wherein the liquid inlet flow-channel, the shell long flow-channels and the liquid outlet flow-channel are circumferentially arranged on the reducer shell around the axis of the motor;
  end cover flow-channels, comprising a plurality of end-cover long flow-channels, and the plurality of end-cover long flow-channels being circumferentially arranged on a motor end cover around the axis of the motor;
  wherein the plurality of shell flow-channels, the plurality of branch flow-channels and the end cover flow-channels form a continuous total flow-channel;
  a liquid inlet disposed on the reducer shell and in communication with the liquid inlet flow-channel; and
  a liquid outlet disposed on the reducer shell and in communication with the liquid outlet flow-channel
  wherein a first resin glue is disposed outside one end of coils of the motor close to the reducer shell, and wherein the first resin glue is located inside a circumference formed by the plurality of shell flow-channels and configured to form a closed space with the reducer shell as a cooling flow-channel for the first resin glue, wherein an inner wall of the liquid outlet flow-channel is defined with an opening, and the opening of the liquid outlet flow-channel and the liquid outlet are respectively arranged on both sides of the first resin glue.

10. A vehicle, comprising a drive assembly, and the drive assembly comprising:
a motor;
a reducer; and
a motor cooling structure, comprising:
  a plurality of branch flow-channels circumferentially arranged on a stator of a motor around an axis of the motor and running through the stator of the motor;
  a plurality of shell flow-channels arranged on a side wall of a reducer shell and comprising a liquid inlet flow-channel, shell long flow-channels and a liquid outlet flow-channel, wherein the liquid inlet flow-channel, the shell long flow-channels and the liquid outlet flow-channel are circumferentially arranged on the reducer shell around the axis of the motor;
  end cover flow-channels, comprising a plurality of end-cover long flow-channels, and the plurality of end-cover long flow-channels being circumferentially arranged on a motor end cover around the axis of the motor;
  wherein the plurality of shell flow-channels, the plurality of branch flow-channels and the end cover flow-channels form a continuous total flow-channel;
  a liquid inlet disposed on the reducer shell and in communication with the liquid inlet flow-channel; and
  a liquid outlet disposed on the reducer shell and in communication with the liquid outlet flow-channel
  wherein a first resin glue is disposed outside one end of coils of the motor close to the reducer shell, and wherein the first resin glue is located inside a circumference formed by the plurality of shell flow-channels and configured to form a closed space with the reducer shell as a cooling flow-channel for the first resin glue, wherein an inner wall of the liquid outlet flow-channel is defined with an opening, and the opening of the liquid outlet flow-channel and the liquid outlet are respectively arranged on both sides of the first resin glue.

11. The drive assembly according to claim 9, wherein the plurality of branch flow-channels extend along the axis of the motor.

12. The drive assembly according to claim 9, wherein a second resin glue is provided outside one end of the coils of the motor close to the motor end cover, and the second resin glue is located inside a circumference formed by the end cover flow-channels.

13. The drive assembly according to claim 12, wherein the end cover flow-channels further comprises end-cover short flow-channels, wherein two end-cover short flow-channels and the plurality of end-cover long flow-channels are circumferentially arranged on the motor end cover around the axis of the motor, and inner walls of the two end-cover short flow-channels are respectively defined with an opening.

14. The drive assembly according to claim 13, wherein the two end-cover short flow-channels are respectively arranged on both sides of the second resin glue.

15. The drive assembly according to claim 9, wherein one branch flow-channel and an adjacent branch flow-channel on one side are in communication with each other through a shell long flow-channel.

16. The drive assembly according to claim 15, wherein the one branch flow-channel and another adjacent branch flow-channel on another side are in communication with each other through an end-cover long flow-channel.

17. The drive assembly according to claim 9, wherein the liquid outlet is connected to an oil inlet of the reducer.

\* \* \* \* \*